US008144641B2

(12) United States Patent
Huo et al.

(10) Patent No.: US 8,144,641 B2
(45) Date of Patent: Mar. 27, 2012

(54) SYSTEM AND METHOD FOR IMPLEMENTING AN IN-BAND RELAY SCHEME

(75) Inventors: Changqin Huo, Calgary (CA); Dorin Viorel, Calgary (CA); Masato Okuda, Saitama (JP)

(73) Assignee: Fujitsu Semiconductor Limited, Kanagawa (JP)

( * ) Notice: Subject to any disclaimer, the term of this patent is extended or adjusted under 35 U.S.C. 154(b) by 396 days.

(21) Appl. No.: 12/497,177

(22) Filed: Jul. 2, 2009

(65) Prior Publication Data

US 2010/0002622 A1    Jan. 7, 2010

Related U.S. Application Data

(60) Provisional application No. 61/078,061, filed on Jul. 3, 2008.

(51) Int. Cl.
*H04J 1/10* (2006.01)
(52) U.S. Cl. ...................................... 370/315
(58) Field of Classification Search .................. 370/315, 370/316, 330, 328, 329, 338, 349, 401, 295, 370/281, 492, 501, 341, 274, 276; 455/11.1, 455/16, 13.1, 67.11
See application file for complete search history.

(56) References Cited

U.S. PATENT DOCUMENTS 5,408,679 A * 4/1995 Masuda ........................ 455/11.1

OTHER PUBLICATIONS

Draft Standard for Local and Metropolitan Area Networks, Part 16: Air Interface for Broadband Wireless Access Systems, P802.16 Rev2/D7 Oct. 2008, © 2008 IEEE (2080 pgs.).
Huo, U.S. Appl. No. 12/495,572, filed Jun. 30, 2009, *System and Method for Implementing an Out-of-Band Relay Scheme* patent application.

* cited by examiner

*Primary Examiner* — Chi Pham
*Assistant Examiner* — Alexander Boakye
(74) *Attorney, Agent, or Firm* — Baker Botts L.L.P.

(57) ABSTRACT

A method for implementing an in-band relay scheme includes establishing a connection between a base station and a relay station and between the relay station and a mobile station using a frequency. The method also includes receiving data from the base station during a frame via the frequency, the frame comprising a downlink sub-frame, and an uplink sub-frame, wherein the data is received during a beginning portion of the downlink sub-frame. The method further includes transitioning from receive to transmit during the downlink sub-frame. The method additionally includes transmitting data, received from the base station during a previous frame, to the endpoint during a later portion of the downlink sub-frame via the frequency. The method also includes transmitting data received from the endpoint during a previous frame, to the base station during a beginning portion of the uplink sub-frame via the frequency. The method further includes transitioning from transmit to receive during the uplink sub-frame. The method also includes receiving data from the endpoint during a later portion of the uplink sub-frame via the frequency.

18 Claims, 4 Drawing Sheets

SYSTEM AND METHOD FOR IMPLEMENTING AN IN-BAND RELAY SCHEME

CROSS-REFERENCE TO RELATED APPLICATION

This application claims the benefit of priority under 35 U.S.C. §119(e) of U.S. Provisional Application Ser. No. 61/078,061 filed Jul. 3, 2008.

TECHNICAL FIELD

The present invention relates generally to wireless networks and more particularly to systems and methods for implementing in-band relay schemes.

BACKGROUND

IEEE 802.16 is an emerging suite of standards for Broadband Wireless Access (BWA). It defines a high-throughput packet based data network radio interface capable of supporting several classes of Internet Protocol (IP) applications and services including isochronous applications such as Voice Over IP (VoIP) and applications with burst data access profiles such as TCP applications. The IEEE 802.16e amendment to the IEEE 802.16 base specification enables combined, fixed, and mobile operation in licensed and license-exempted frequency bands under 11 GHz.

A relay station (RS) may extend radio coverage or increase the throughput of a macro-base station (mBS). An RS may be a low-cost alternative to a base station. It transfers data of active service flows between an mBS and endpoints, in both directions.

SUMMARY

The teachings of the present disclosure relate to a method for implementing an in-band relay scheme that includes establishing a connection between a base station and a relay station using a frequency and establishing a connection between the relay station and a mobile station using the frequency. The method also includes receiving data from the base station during a frame via the frequency, the frame comprising a downlink sub-frame, and an uplink sub-frame, wherein the data is received during a beginning portion of the downlink sub-frame. The method further includes transitioning from receive to transmit during the downlink sub-frame. The method additionally includes transmitting data to the endpoint during a later portion of the downlink sub-frame via the frequency. The data is received from the base station during one of a plurality of previous frames. The method also includes transmitting data to the base station during a beginning portion of the uplink sub-frame via the frequency. The data is received from the endpoint during one of the plurality of previous frames. The method further includes transitioning from transmit to receive during the uplink sub-frame. The method also includes receiving data from the endpoint during a later portion of the uplink sub-frame via the frequency.

Technical advantages of particular embodiments include allowing a relay station to use a single radio and frequency for its associated access links and relay link. Accordingly, the relay station may reduce the time the radio spends transitioning between sending and receiving data and switching between frequencies.

Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
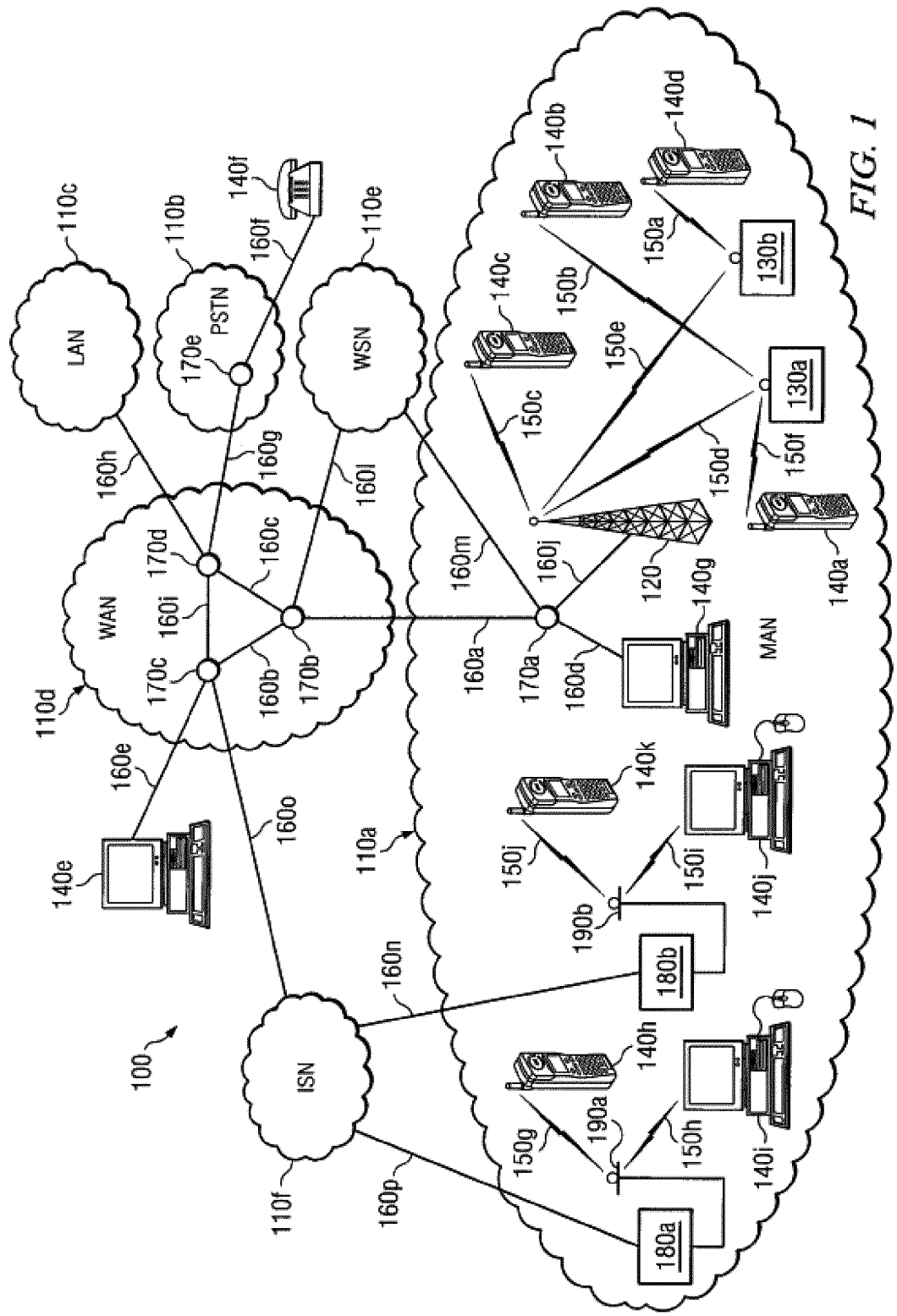
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks comprising any of a variety of communication protocols designed to support one or more different services either independently or in conjunction with other networks and/or communications protocols. For example, networks 110 may facilitate network and/or Internet access via wired or wireless connections (e.g., a WiMAX service). The network access may allow for online gaming, file sharing, peer-to-peer file sharing (P2P), voice over Internet protocol (VoIP) calls, video over IP calls, or any other type of functionality typically provided by a network. In particular embodiments, one or more of networks 110 may comprise an 802.16 based wireless network, popularly known as WiMAX, which may include macro base stations (mBSs), such as mBS 120, relay stations (RSs), such as RSs 130, and femto base stations (fBSs), such as fBSs 190.

In particular embodiments, network 110a may utilize IEEE 802.16e which may allow for one or more of relay stations 130 to implement an in-band relay scheme without making any changes to the IEEE standard. By using an in-band relay scheme, relay stations 130 may use the same frequency band in both the relay link (e.g., between relay station 130a and base station 120) and the access link (e.g., between relay station 130a and endpoint 140a). In particular embodiments, the relay station may only include a single radio/antenna. The in-band relay scheme may also require the relay station to make a smaller number of transmit (TX)/receive (RX) and RX/TX transitions, as compared to a traditional relay station. For example, in some embodiments, each frame may only have one TX/RX transition and one RX/TX transition. Accordingly, the implementation complexity of the relay station may be reduced.

Figure 2:
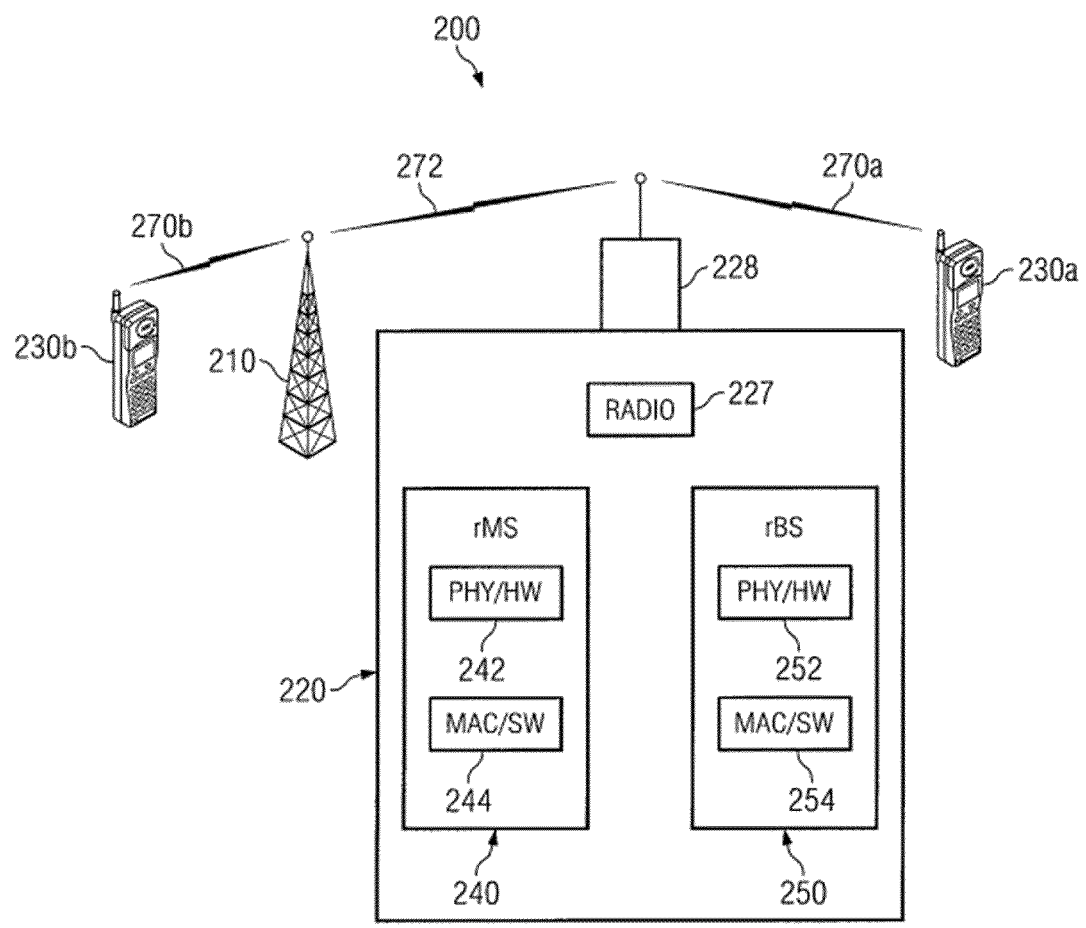
FIG. 2 illustrates a wireless network comprising a more detailed view of a relay station, in accordance with a particular embodiment.

In particular embodiments, relay stations 130 may comprise an endpoint module and a base station module, as shown in FIG. 2. The two modules may share the same radio/antenna with one another. The radio may include one or more analog transmitters/receivers and/or power amplifiers (PA) and it may be connected to one or more antennae. For example, in embodiments employing multiple input multiple output (MIMO) technologies (e.g., IEEE 802.16) the radio may consist of a number of analog transmitters/receivers and PAs and may be connected to a number of antennas as specified by the respective MIMO technology.

Each of endpoints 140 is connected to one of mBS 120, RSs 130, or fBSs 190. For simplicity, the component to which an endpoint is connected may be generally referred to as an access station. For example, the access station for endpoint 140e is fBS 190a. Between each endpoint 140 and its respective access station there may be a wireless connection 150, sometimes referred to as an access link. These wireless connections may be referred to as access links because they provide the endpoint with access to a network. Similarly, between each RS and mBS (or between two RSs) there may be a wireless connection 150, sometimes referred to as a relay link. This wireless connection may be referred to as a relay link because it relays communications between the access links and the mBS.

A wireless connection may comprise various wireless resources such as, for example, a combination of a particular center frequency, a particular bandwidth, a particular time slot, and/or a particular subchannel or group of subchannels (for example, as described in a downlink or uplink map). In particular embodiments, it may be convenient to discuss the resources used by a link in terms of slots. Depending on the embodiment, a slot may comprise a particular number of subchannels and symbols (also known as time slots). For example, Section 8.4.3.1 of the Institute of Electrical & Electronics Engineers (IEEE) 802.16e-2005 Standard specifies a slot comprising a single subchannel and two symbols.

Although the example communication system 100 of FIG. 1 includes six different networks, networks 110a-110f, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110f may be implemented as a LAN, WAN, MAN, PSTN, WiMAX network, global distributed network such as the Internet, Intranet, Extranet, or any other form of wireless or wired network.

Networks 110 may include any number and combination of wired links 160, wireless connections 150, nodes 170 and/or endpoints 140. For purposes of illustration, and only by way of example, network 110a is a MAN that may be implemented, at least in part, via WiMAX; network 110b is a PSTN (e.g., a voice based network); network 110c is a LAN; network 110d is a WAN (e.g., a long range optical network or the Internet); WSN network 110e may be operated by a wireless service provider ("WSP") responsible for providing network 110a with wireless service (e.g., WiMAX); and Internet service network (ISN) network 110f may be operated by an internet service provider ("ISP") responsible for providing its users with Internet access. Though not depicted in FIG. 1, both WSN network 110e and ISN network 110f may include servers, modems, gateways and any other components that may be needed to provide their respective service.

While networks 110 have been depicted as six separate networks, depending on the scenario any two, or more, of the networks may be a single network. For example, the WSP and the ISP may be the same business entity which may maintain the necessary components for both services on the same network thus merging ISN network 110f and WSN network 110e into a single network. Furthermore, the interconnections between networks 110 may vary from those depicted in FIG. 1. For example, if an owner uses Digital Subscriber Line (DSL) for his internet access, his fBS may connect through PSTN 110b.

Generally, networks 110a, and 110c-110f provide for the communication of packets, cells, frames, or other portions of information (generally referred to as packets herein) between endpoints 140 and/or nodes 170 (described below). In particular embodiments, networks 110a, and 110c-110f may be IP networks. IP networks transmit data by placing the data in packets and sending each packet individually to the selected destination, along one or more communication paths. Network 110b may, for example, be a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b and/or 110d (e.g., nodes 170e and/or 170c may comprise a gateway). The gateway may allow PSTN 110b to be able to communicate with non-PSTN networks such as any one of networks 110a or 110c-110f.

Any of networks 110a or 110c-110f may be coupled to other IP networks including, but not limited to, the Internet. Because IP networks share a common method of transmitting data, signals may be transmitted between devices located on different, but interconnected, IP networks. In addition to being coupled to other IP networks, any of networks 110a or 110c-110f may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

As noted above, wireless connections 150 may represent wireless links between two components using, for example, WiMAX. The extended range of a WiMAX mBS, along with one or more RSs and fBSs, in certain cases, may allow network 110a to cover the larger geographic area associated with a MAN while using a relatively small number of wired links. More specifically, by properly arranging mBS 120, multiple RSs 130 and fBSs 190 around a metropolitan area, the multiple access stations may use wireless connections 150 or existing wired links to communicate with mBS 120, and wireless connection 150 to communicate with wireless endpoints 140 throughout the metropolitan area. mBS 120 may, through wired connection 160a, communicate with other mBSs, any components of WSN network 110e, any network components not capable of establishing a wireless connection, and/or other networks outside of the MAN, such as network 110d or the Internet.

Nodes 170 may include any combination of network components, modems, session border controllers, gatekeepers, ISN gateways, WSN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100. For example, node 170a may comprise another mBS that is wired to mBS 120 via link 160j and to network 110d via link 160a. As a mBS, node 170a may be able to establish several wireless connections of its own with various other mBSs, RSs, and/or endpoints. As another example, node 170e may comprise a gateway. As a gateway node 170e may allow network 110b, a PSTN network, to be able to transmit and receive communications from other non-PSTN networks, such as network 110d, an IP network. More specifically, as a gateway, node 170e may translate communications between the various protocols used by networks 110b and 110d.

Network access devices 180 may provide Internet access to fBSs 190 through any combination of hardware, software embedded in a computer readable medium, and/or encoded logic incorporated in hardware or otherwise stored (e.g., firmware). In particular embodiments, network access device 180 may be supplied by the owner's ISP. For example, if the owner's ISP is a cable company then the ISP may supply a cable modem as the network access device 180. As another example, if the owner's ISP is a phone company then the ISP may supply an xDSL modem as the network access device 180. As may be apparent, network access device 180 may provide Internet access to components other than fBSs 190. For example, the owner may connect his personal computer to network access device 180 to access the Internet.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140k may include a cell phone, an IP telephone, a computer, a video monitor, a camera, a personal data assistant or any other hardware, and/or software or logic that supports the communication of packets (or frames) using one or more of networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

FIG. 2 illustrates a wireless network comprising a more detailed view of a relay station, in accordance with a particular embodiment. More specifically, the depicted embodiment is a simplified scenario in which network 200 comprises base station 210, relay station 220 and endpoints 230. In different embodiments, network 200 may comprise any number of wired or wireless networks, base stations, endpoints, relay stations, and/or any other components that may facilitate or participate in the communication of data and/or signals whether via wired or wireless connections.

Relay station 220 comprises endpoint module 240 and base station module 250. In particular embodiments, endpoint module 240 and base station module 250 may be a similar type of module (comprising similar components) as used in an endpoint and base station, respectively. These two modules may share a common radio 227. These components may work together in order to provide RS 220 with wireless networking functionality, such as relaying communications between endpoint 230a and base station 210 using the same frequency for both access link 270a and relay link 272.

Base station 210 may be any type of base station able to establish wireless connections with endpoints and relay stations. Base station 210 may comprise any hardware and/or encoded software or logic needed to provide base station functionality. For example, in particular embodiments, base station 210 may be the only base station within a wireless cell responsible for providing wireless connections to a relatively large geographic area. The coverage may be enhanced through the use of relay station 220. In certain embodiments, base station 210 may group together the data destined for endpoints within the cell that are connected via a relay station. This data may be sent/received during the beginning of each respective uplink or downlink sub-frame (see FIG. 3).

Endpoints 230 may be any type of wireless endpoints able to send and receive data and/or signals to and from base station 210 and/or relay station 220. Endpoints 230 may comprise any hardware and/or encoded software or logic needed to provide endpoint functionality. Some possible types of endpoints 230 may include desktop computers, PDAs, cell phones, smart phones, laptops, and/or VoIP phones.

Endpoint module 240 and base station module 250 may each comprise their own respective physical layer or hardware (PHY/HW) blocks 242 and 252 and media access control layer or software (MAC/SW) blocks 244 and 254, and may share radio 227 and antenna 228. PHY/HW blocks 242 and 252 may include any hardware needed for the operation of RS 220. For example, PHY/HW blocks 242 and 252 may each comprise one or more processors. Each processor within the respective PHY/HW block may be a microprocessor, controller, application specific integrated circuit (ASIC), field programmable gate array (FPGA), or any other suitable computing device, resource, or combination of hardware, software and/or encoded logic operable to provide, either alone or in conjunction with other components, (e.g., memory) wireless networking functionality. Such functionality may include providing various wireless features discussed herein. For example, one or more of the processors within PHY/HW blocks 242 and/or 252 may be able to process data received from, for example, base station 210 and prepare it to be sent to endpoint 230a. This may include determining any resource allocations needed for the relay of the data.

PHY/HW blocks 242 and 252 may also each comprise memory modules. Each memory module may be any form of volatile or non-volatile memory including, without limitation, magnetic media, optical media, random access memory (RAM), read-only memory (ROM), flash memory, removable media, or any other suitable local or remote memory component or components. The memory modules may store any suitable data, instructions, logic or information utilized by relay station 220, including software embedded in a computer readable medium, and/or encoded logic incorporated in hardware or otherwise stored (e.g., firmware). For example, the memory modules may store the data received during a previous frame until it is transmitted during a subsequent frame or a subsequent zone within the same frame. Additional examples of information stored by the memory modules will be discussed below.

MAC/SW blocks 244 and 254 may include any software, logic, or other information needed for the operation of relay station 220. In particular embodiments, the software, logic or other information may be stored within the memory modules of PHY/HW blocks 242 and/or 252. For example, MAC/SW blocks 244 and 254 may comprise, stored within the respective memory modules, logic that when executed by PHY/HW block is operable to implement respective relay station tasks such as receiving data during a particular frame and later transmitting the data during a subsequent frame.

Radio 227 may be coupled to or a part of antenna 228 to send/receive data to/from base station 210 and endpoint 230a. In sending data, radio 227 may convert digital data prepared by at least one of the processors of PHY/HW blocks 242 or 252 into a radio signal having the appropriate center frequency and bandwidth parameters. These parameters may be predetermined, for example, by a combination of PHY/HW blocks 242 and 252 and MAC/SW blocks 244 and 254. The radio signal may then be transmitted via antenna 228 to the appropriate recipient. In receiving data, antenna 228 may receive a radio signal which radio 227 may convert into digital data to be processed by PHY/HW blocks 242 and/or 252, and/or MAC/SW blocks 244 and/or 254, as appropriate.

Antenna 228 may be any type of antenna capable of transmitting and receiving data and/or signals wirelessly. In some embodiments, antenna 228 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 227 and antenna 228 may form a wireless interface.

Figure 3:
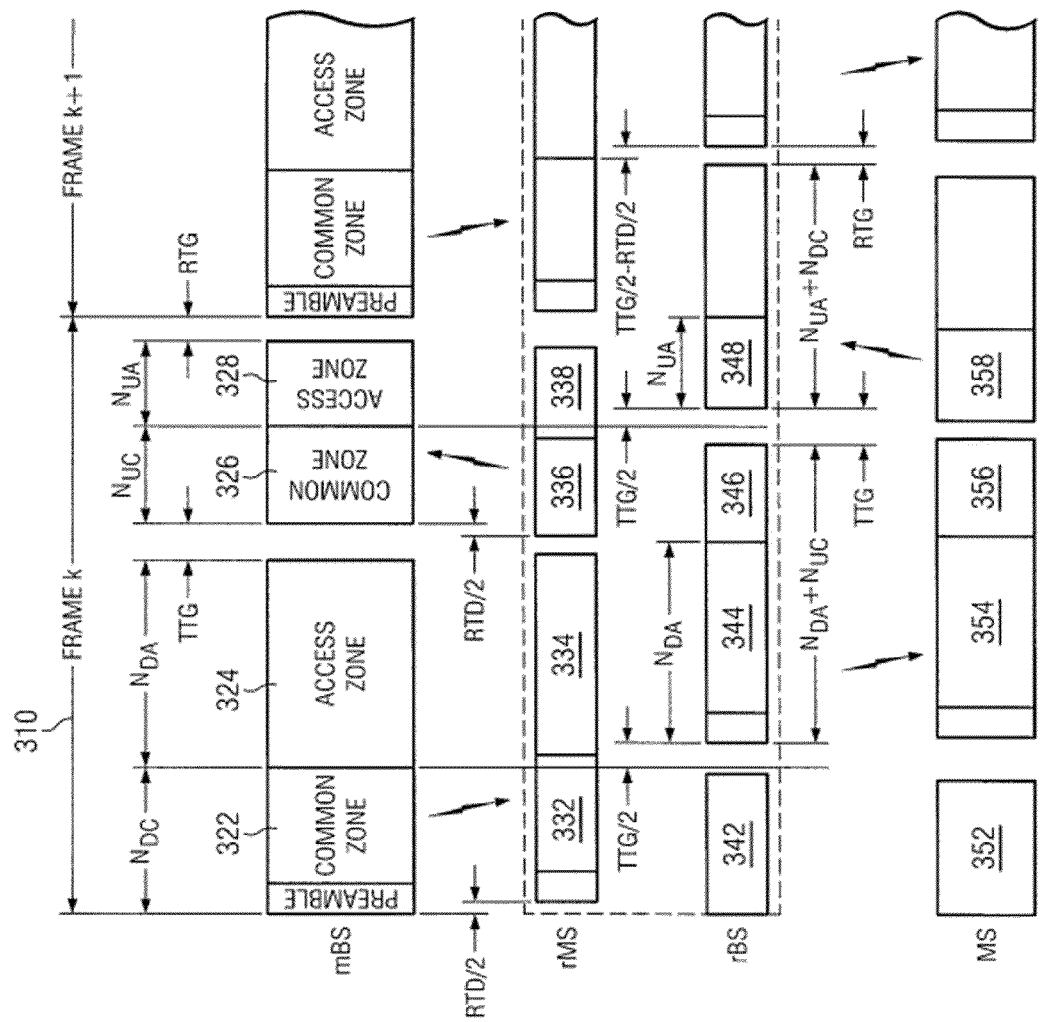
FIG. 3 illustrates a frame structure used in a wireless network, in accordance with a particular embodiment.

FIG. 3 illustrates a frame structure used in a wireless network, in accordance with a particular embodiment. More specifically, base station frame 320 depicts the frame structure of a base station frame, relay station frame 330 depicts the frame structure of a relay station frame, and endpoint frame structure 350 depicts the frame structure of an endpoint frame. Furthermore, with respect to relay station frame 330, the frame structure for both an endpoint module (e.g., endpoint module 240) and a base station module (e.g., base station module 250) are depicted. The depicted frame structure marks the timing of when the various entities transmit and receive data. For convenience, each of the zones within frame 310 have been individually numbered (zones 322, 324, 326, 328, 332, 334, 336, 338, 342, 344, 346, 348, 352, 354, 356, and 358).

The following example, refers to both FIGS. 2 and 3 to help better understand how the various components of relay station 220 may work in a particular situation. For purposes of this example, it may be assumed that relay station 220 has established relay link 272 with base station 210 and access link 270a with endpoint 230a. Furthermore, in this example, it may be assumed that a frame structure is used in which each frame (e.g., frame 310) may be divided into an uplink sub-frame and a downlink sub-frame. During the downlink sub-frame base station 210 may transmit information to both relay station 220 and endpoint 230b. More specifically, zone 322 may be used by base station 210 to deliver data to relay station 220 (e.g., data for endpoint 230a) and zone 324 may be used to deliver data to endpoint 230b (in some embodiments, data may be delivered to endpoints connected directly to base station 210 during both zones 322 and 324). Zones 322 and 324 may be positioned within the downlink sub-frame. In particular embodiments, base station 210 may ensure that data for relay station 220 is transmitted before transmitting any data to any endpoints connected to base station 210 (e.g., endpoint 230b). Zone 326 may be used to receive data from relay station 220 and zone 328 may be used to receive data from endpoint 230b (in some embodiments, data may be received from endpoints connected directly to base station 210 during both zones 326 and 328). Zones 326 and 328 may both be positioned within the uplink sub-frame.

Base station frame 320, used by base station 210, may comply with the wireless standard being used by network 200 (e.g., the IEEE 802.16e standard). In particular embodiments, it may be desirable for base station 210 to schedule all the traffic with relay station 220 (e.g., the traffic to/from endpoint 230a) to occur during zones 322 and 326 at the beginning of each sub-frame.

The data transmitted by base station 210 during zone 322 may be received by endpoint module 240 during zone 332. The data received during zone 332 may later be transmitted to endpoint 230a during zone 344 of a subsequent frame or a subsequent zone within the same frame. Zone 332 may start half the round-trip delay (RTD) time after the start of frame 310. This may account for the delay associated with the wireless signal propagating from base station 210 to relay station 220. During zone 336 endpoint module 240 may transmit data to base station 210. Zone 336 may start one half the RTD time before the start of zone 326.

During zone 344 base station module 250 may transmit data to endpoint 230a. The data sent during zone 344 of frame 310 may be data received from base station 210 during a previous frame or a previous zone within the same frame. During zone 348 the base station module 250 may receive data from endpoint 230a. The data received from endpoint 230a during frame 310 may be sent to base station 210 during a subsequent frame or a subsequent zone within the same frame. In some embodiments, a two frame delay may exist between when data is received and when it is relayed to the appropriate recipient.

Because both endpoint module 240 and base station module 250 share a common radio 227 and antenna 228, only one of them is able to access radio 227 at any given time. Accordingly, during zones 334 and 338 endpoint module 240 may be neither receiving nor sending data wirelessly and during zones 342 and 346 base station module 250 may be neither receiving nor sending data wirelessly. Furthermore, because both base station module 250 and endpoint module 240 are using the same frequency, radio 227 may not need to wait to perform a transition between transmitting data to endpoint 230a during zone 344 and transmitting data to base station 210 during zone 336. Thus, radio 227 may need only make two transitions, one from receive to transmit between zones 332 and 344 and one from transmit to receive between zones 336 and 348.

As indicated above, in some embodiments, there may be a two frame delay between when data is received and when the received data is relayed to the appropriate recipient. This delay provides time for PHY/HW blocks 242 and 252, and MAC/SW blocks 244 and 254 to receive, process and relay the data. For example, assume base station 210 sends data for endpoint 230a to relay station 220. Radio 227 and antenna 228 may receive the data via relay link 272. PHY/HW block 242 and MAC/SW block 244 may receive, examine, and/or process the data. Then the data may be communicated within relay station 220 from endpoint module 240 to base station module 250. Then, PHY/HW block 252 and MAC/SW block 254 may receive, examine, and/or process the data in preparation to be sent to endpoint 230a through access link 270a via radio 227 and antenna 228.

Thus far, several different embodiments and features have been presented. Particular embodiments may combine one or more of these features depending on operational needs and/or component limitations. This may allow for great adaptability of network 200 to the needs of various organizations and users. For example, a particular embodiment may use several base stations to provide wireless access for a metropolitan area, or a single base station may be used with several relay stations to provide the necessary coverage. Furthermore, some embodiments may include additional features.

Figure 4:
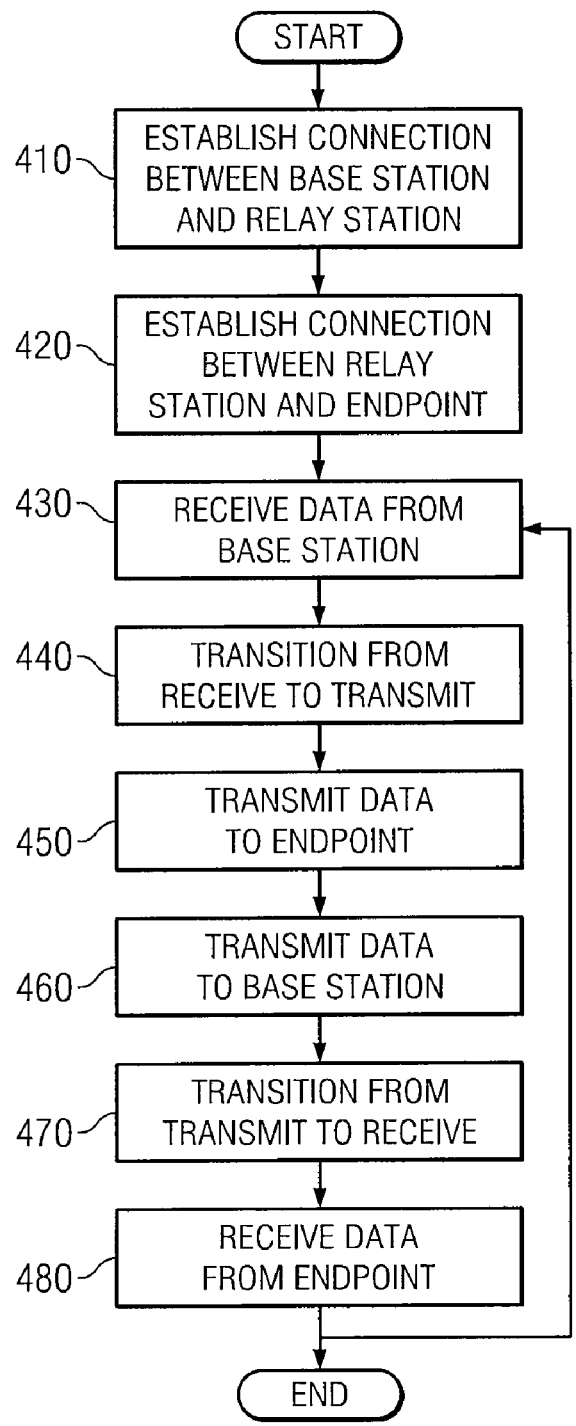
FIG. 4 illustrates a method for implementing a wireless access connection, in accordance with a particular embodiment.

FIG. 4 illustrates a method for implementing a wireless access connection, in accordance with a particular embodiment. The method begins at step 410 with the establishment of a wireless connection between a base station and a relay station. This connection may generally be referred to as a relay link. In particular embodiments, the relay link may be a WiMAX relay link. At step 420 a wireless connection between the relay station and an endpoint is established. This connection may generally be referred to as an access link. In certain embodiments, the access link may be a WiMAX access link. In certain embodiments, both the access link and the relay link may comprise the same frequency. After completing steps 410 and 420 the relay station is configured to be functionally located between the base station and the endpoint. This may allow the base station to be able to communicate with the endpoint via the relay station.

At step 430 the relay station receives data from the base station during a current frame. In certain embodiments, the data may be received at an endpoint module within the relay station. The endpoint module may comprise components and features similar to those found in an endpoint (for receiving/transmitting data wirelessly). In some embodiments, the data received from the base station may be received at the beginning of the current frame. Besides sending information and data to the relay station, the base station may also send data and information to any endpoints that are connected directly with the base station. In certain embodiments, the data transmitted by the base station may be done during the first portion of the frame, sometimes referred to as the downlink sub-frame. The data received from the base station during the current downlink sub-frame may be for the endpoint. However, the data may not be immediately sent to the endpoint-rather it may be sent during a subsequent frame or a subsequent zone within the same frame. For example, in particular embodiments the data may be sent two frames after the current frame.

At step 440 the relay station may transition from receive to transmit. In other words, the radio may adjust various internal parameters to change from being configured to receive data wirelessly to being configured to transmit data wirelessly. The length of time for this transition to occur may be referred to as a receive/transmit transition gap (RTG). In some embodiments, this RTG may be the only RTG for the relay station within the current frame. The RTG, and the transmit/receive transition gap, TTG (see step 470) may be similar to the TTG and RTG discussed in the IEEE 802.16-2005 standard. During the transition, control of the radio within the relay station may switch from the endpoint module to a base station module.

At step 450 the relay station transmits data to the endpoint. The data may be transmitted by a base station module within the relay station. The data that is transmitted to the endpoint may have been received from the base station during a previous frame or a previous zone within the same frame. The delay between when the data was initially received at the relay station during the previous frame, or a previous zone within the same frame, and when it is transmitted to the endpoint during the current frame may account for the time it takes for the data to be processed at the endpoint module, provided to, and processed by, the base station module within the relay station.

At step 460 data is transmitted from the relay station to the base station. This data may be sent through the endpoint module within the relay station. As with data sent to the endpoint, data sent to the base station may have been received from the endpoint during a previous frame or a previous zone within the same frame. The delay between when the data was initially received and when it is ultimately sent may account for delay in internal processing within the relay station as the data is transferred between, and processed by, the base station module and the endpoint module. In transmitting the data to the base station the endpoint module may have regained control of the radio from the base station module. Because both the relay link and the access link use the same frequency, there is no need for the radio to transition between frequencies when the endpoint module gains control from the base station module. The data received by the base station from the relay station may be received after the downlink sub-frame during the uplink sub-frame of the current frame. The uplink sub-frame may begin after the base station has transitioned from transmit to receive.

At step 470 the relay station may transition from transmit to receive. The transition from transmit to receive may be similar, but reversed, to the transition from receive to transmit at step 440. Then at step 480 the relay station may receive data from the endpoint. This data may be received via the base station module. As with the data received from the base station, the data received from the endpoint at step 480 may be sent to the base station during a subsequent frame or a subsequent zone within the same frame. Assuming that both the access link and the relay link are still active, the method may return 430. In other words, steps 430 through 480 may be repeated each frame for as long as both connections (the access link and the relay link) remain established.

Some of the steps illustrated in FIG. 4 may be combined, modified or deleted where appropriate, and additional steps may also be added to the flowchart. For example, during some frames the base station or the endpoint may not have any data to send. Additionally, steps may be performed in any suitable order without departing from the scope of particular embodiments.

Although particular embodiments have been described in detail, it should be understood that various other changes, substitutions, combinations and alterations may be made hereto without departing from the spirit and scope of the disclosure. For example, although an embodiment has been described with reference to a number of elements included within communication system 100 such as endpoints, base stations and relay stations, these elements may be combined, rearranged or positioned in order to accommodate particular routing architectures or needs. In addition, any of these elements may be provided as separate external components to communication system 100 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed:
1. A method for implementing an in-band relay scheme, comprising:
    establishing a connection between a base station and a relay station using a frequency;
    establishing a connection between the relay station and a mobile station using the frequency;

receiving data from the base station during a frame via the frequency, the frame comprising a downlink sub-frame and an uplink sub-frame, wherein the data is received during a beginning portion of the downlink sub-frame;

transitioning from receive to transmit during the downlink sub-frame;

transmitting data to the endpoint during a later portion of the downlink sub-frame via the frequency, the data received from the base station during one of a plurality of previous frames;

transmitting data to the base station during a beginning portion of the uplink sub-frame via the frequency, the data received from the endpoint during one of the plurality of previous frames;

transitioning from transmit to receive during the uplink sub-frame; and receiving data from the endpoint during a later portion of the uplink sub-frame via the frequency.

2. The method of claim 1, wherein:

receiving data from the base station comprises receiving data from the base station via an endpoint module within the relay station; and transmitting data to the base station comprises transmitting data to the base station via the mobile station module.

3. The method of claim 1, wherein:

receiving data from the endpoint comprises receiving data from the endpoint via a base station module within the relay station; and transmitting data to the endpoint comprises transmitting data to the endpoint via the base station module.

4. The method of claim 1, wherein the plurality of previous frames occurred at least two frames prior to the frame.

5. The method of claim 1, further comprising:

transmitting the data received from the base station during the frame to the endpoint during one of a plurality of subsequent frames; and transmitting the data received from the endpoint during the frame to the base station during one of the plurality of subsequent frames.

6. The method of claim 1, wherein the data received from base station during the frame is received prior to the base station transmitting additional data to one or more endpoints having a connection with the base station.

7. A system for implementing an in-band relay scheme, comprising:

an interface operable to:

establish a connection between a base station and a relay station using a frequency; and establish a connection between the relay station and a mobile station using the frequency;

an endpoint module operable to receive data from the base station during a frame via the frequency, the frame comprising a downlink sub-frame and an uplink sub-frame, wherein the data is received during a beginning portion of the downlink sub-frame;

wherein the interface is further operable to transition from receive to transmit during the downlink sub-frame;

a base station module operable to transmit data to the endpoint during a later portion of the downlink sub-frame via the frequency, the data received from the base station during one of a plurality of previous frames;

wherein the endpoint module is further operable to transmit data to the base station during a beginning portion of the uplink sub-frame via the frequency, the data received from the endpoint during one of the plurality of previous frames;

wherein the interface is further operable to transition from transmit to receive during the uplink sub-frame; and wherein the base station module is further operable to receive data from the endpoint during a later portion of the uplink sub-frame via the frequency.

8. The system of claim 7, wherein the endpoint module is within the relay station.

9. The system of claim 7, wherein the base station module is within the relay station.

10. The system of claim 7, wherein the plurality of previous frames occurred at least two frames prior to the frame.

11. The system of claim 7, wherein:

the base station module is further operable to transmit the data received from the base station during the frame to the endpoint during one of a plurality of subsequent frames; and the endpoint module is further operable to transmit the data received from the endpoint during the frame to the base station during one of the plurality of subsequent frames.

12. The system of claim 7, wherein the data received from base station during the frame is received prior to the base station transmitting additional data to one or more endpoints having a connection with the base station.

13. A non-transitory computer readable medium comprising logic that when executed by a processor is operable to:

establish a connection between a base station and a relay station using a frequency;

establish a connection between the relay station and a mobile station using the frequency;

receive data from the base station during a frame via the frequency, the frame comprising a downlink sub-frame and an uplink sub-frame, wherein the data is received during a beginning portion of the downlink sub-frame;

transition from receive to transmit during the downlink sub-frame;

transmit data to the endpoint during a later portion of the downlink sub-frame via the frequency, the data received from the base station during one of a plurality of previous frames;

transmit data to the base station during a beginning portion of the uplink sub-frame via the frequency, the data received from the endpoint during one of the plurality of previous frames;

transition from transmit to receive during the uplink sub-frame; and receive data from the endpoint during a later portion of the uplink sub-frame via the frequency.

14. The medium of claim 13, wherein the logic operable to:

receive data from the base station comprises logic operable to receive data from the base station via an endpoint module within the relay station; and transmit data to the base station comprises logic operable to transmit data to the base station via the mobile station module.

15. The medium of claim 13, wherein the logic operable to:

receive data from the endpoint comprises logic operable to receive data from the endpoint via a base station module within the relay station; and transmit data to the endpoint comprises logic operable to transmit data to the endpoint via the base station module.

16. The medium of claim 13, wherein the plurality of previous frames occurred at least two frames prior to the frame.

17. The medium of claim 13, the logic is further operable to:

transmit the data received from the base station during the frame to the endpoint during one of a plurality of subsequent frames; and transmit the data received from the endpoint during the frame to the base station during one of the plurality of subsequent frames.

18. The medium of claim 13, wherein the data received from base station during the frame is received prior to the base station transmitting additional data to one or more endpoints having a connection with the base station.

* * * * *